June 6, 1967 E. KÜSTERS ETAL Re. 26,219

ROLL FOR THE PRESSURE TREATMENT OF WEB MATERIAL, ESPECIALLY PAPER

Original Filed Sept. 1, 1961

Inventors
Eduard Küsters
Valentin Appenzeller
By their attorneys
Howson and Howson United States Patent Office Re. 26,219

Reissued June 6, 1967

26,219

ROLL FOR THE PRESSURE TREATMENT OF WEB MATERIAL ESPECIALLY PAPER

Eduard Küsters, Krefeld, and Valentin Appenzeller, Kempen (Lower Rhine), Germany, assignors to Eduard Kusters Maschinenfabrik, Krefeld, Germany, a German company Original No. 3,131,625, dated May 5, 1964, Ser. No. 135,680, Sept. 1, 1961. Application for reissue May 4, 1966, Ser. No. 552,672

Claims priority, application Germany, June 30, 1961, K 44,155

12 Claims. (Cl. 100—170)

Matter enclosed in heavy brackets [ ] appears in the original patent but forms no part of this reissue specification; matter printed in italics indicates the additions made by reissue.

*ABSTRACT OF THE DISCLOSURE*

*A roll formed by a tubular body rotates about a stationary core. Fluid pressure means exert roll contour controlling pressure between the core and the inside of the roll, transmitting pressure to the latter through one or more sliding shoes curved to fit and supplied with oil under pressure to form an oil cushion between the shoe or shoes and the inside of the roll.*

Figure 1:
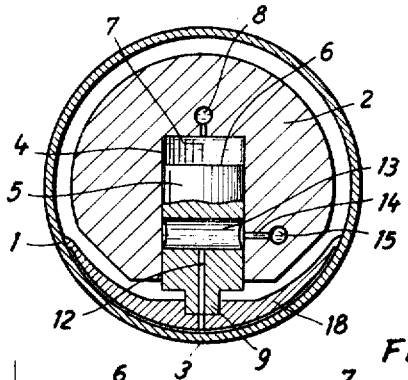

The invention relates to a roll for the pressure treatment of webs of material, for smoothing and embossing paper and other materials, squeezing out the moisture from textiles, calendering and spreading plastic and rubber foils and the like, as well as for other pressing operations, which roll consists of a drum or tube-shaped hollow body designed to revolve and constituting the peripheral wall of the roll and a stationary core supported at its ends and extending through the solid body with a clearance between its and the inner side of the hollow body over the entire length thereof, said core being equipped with cylinders distributed along its length in which a fluid pressure medium acts on pistons for exerting pressure against the inner side of the hollow body on the side directed toward the working line.

It is known that rolls for the pressure treatment of web material bend towards the side remote from the working point when in operation and thereby have a detrimental effect on the exertion of uniform pressure along the entire length of the roll when the roll is pressed against a counter roll or support through the intermediary of its journals.

To overcome this objection rolls of the type to which the invention relates have been proposed. Thus it has been proposed to provide in the stationary core on the side directed towards the working line blind bores of relatively small diameter extending in the same direction to the imaginary line of contact with the counter roll or counter surface and in the same radial beam or plane as this line and arranged at uniform distances apart, and to provide in these bores pistons projecting therefrom against the inner side of the hollow body, said pistons being acted upon by a pressure fluid introduced into the bores and pressed against the inner side of the hollow body. The friction of these cylinders exerts a braking effect on the rotation of the hollow body. Moreover the pressure pistons acting at intervals or here and there prevent the use of hollow bodies with thin walls and especially when made from yieldable or elastic material.

According to another known proposal, a box-like stationary carrier is arranged in the hollow body and in this box spring or pressure bushings are arranged at relatively great distances apart and connected up with a source of pressure fluid, and on the side of the carrier directed towards the working point stirrups are located on the carrier which are slidable towards the working point over a pin on the inner side of their apex whereby the pressure bushings act on the pins. The stirrups carry a set of rollers which are mutually displaced by 120° and bear against the inner side of the tubular hollow body. A pressure hose can be provided instead of the spring or pressure bushings, whereby the stirrup pins pass through the casing of the hose and are guided thereby. The construction of such a roll is very expensive as well as complicated and prevents the roll from being given the desired small diameter. Such rolls exert only linear pressure at relatively great distances apart and, on account of the relatively great pressure they exert, cause considerable wear. They necessitate the use of runner wheels which transmit deflections on the working side to the opposite side.

According to the invention sliding shoes acting on the inner surface of the hollow body are provided at suitable points on the pistons for transmitting the pressure exerted by the pistons on to the inner periphery of the hollow body, these shoes extending on both sides of the working line on the hollow body in the direction of the inner periphery of the hollow body, viewed in the cross-section of the hollow body, but at the most to a plane passing through the axis of the hollow body at right angles to the radial beam or plane passing through the working point, and sliding means are provided between the operative surface of each sliding shoe facing the inner periphery of the hollow body and the inner peripheral surface of the hollow body.

In the preferred form of construction the sliding means consist of a sliding cushion of oil.

By the invention a roll is produced exerting a uniform pressure against a counter roll or a support, in which the pistons transmit pressure superficially on to the inner periphery of the hollow body or take up pressure therefrom and, in spite of the great total pressure or a great pressure exerted by the roll, the specific surface pressure on the inner periphery of the roll is relatively small, which has the effect of saving the inner peripheral surface of the hollow body. Moreover the guiding of the hollow body in a satisfactory manner is ensured. At the same time the sliding means result in that the frictional resistance against the rotation of the hollow body is only slight and all wear is reduced. This makes it possible to use thin walled hollow bodies and hollow bodies made from yieldable and elastic materials, such as plastics.

If a sliding cushion of oil is provided as sliding means, the pressure exerted on this cushion is greater than the pressure resulting on the main piston bearing so that a film of lubricant is produced on which the supported inner peripheral surface of the hollow body, as it were, floats and conditions are produced which are approximately equivalent to the direct support of the tubular hollow body on the core by fluid means, but hereby the hollow body has a support on the core which does not change in shape. The sliding cushion of oil also prevents steel-against-steel contact, for example when the hollow body and the slide shoes are made from steel.

The sliding shoe surface facing the inner peripheral surface of the hollow body preferably has recesses in the form of a honeycomb or in the form of a subdivision into individual cups. This surface construction ensures a constant distribution of the oil cushion.

An advantage of the invention is also that the roll can be made very small in diameter because the sliding shoes form so-to-speak only parts fitted on the core over the pistons for enlarging the diameter of the core at a certain place.

In particular the construction may be such that the surface of each sliding shoe facing the inner periphery of the hollow body is connected to a pressure oil feed by means of a bore extending from the shoe surface and continued in the piston.

At the same time the piston can have a transverse bore in which the bore leading to the sliding surface of the shoe terminates and which in turn communicates with an oil passage in the core leading to the cylinder wall.

According to the invention rollers in cages can be provided as sliding means on the inner periphery of the hollow body extending along the entire length thereof at the place which is acted upon by the sliding shoes. These rollers may be of steel or of plastic based on polyamides or superpolyamides or of same other suitable material.

Figure 3:
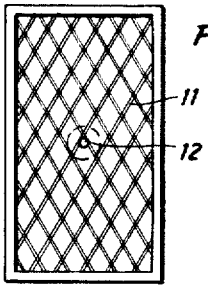
Figure 2:
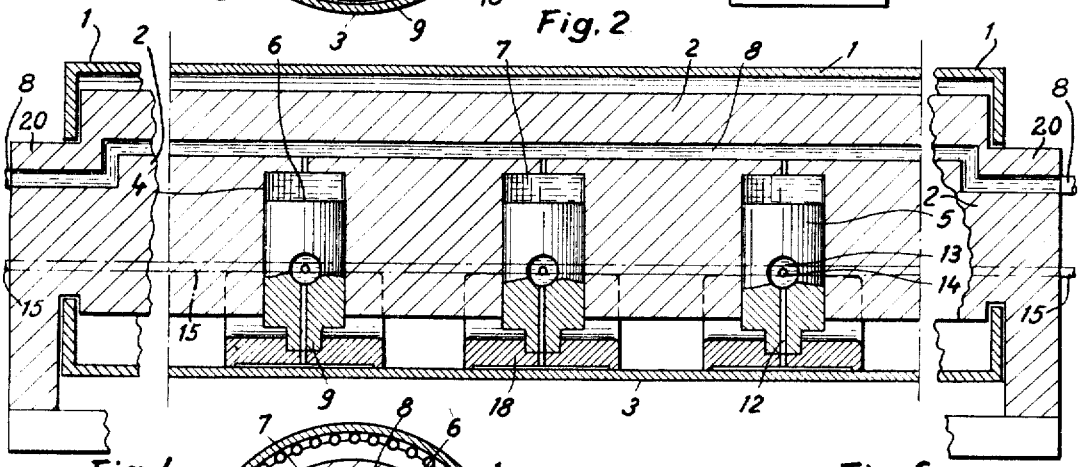
Figure 4:
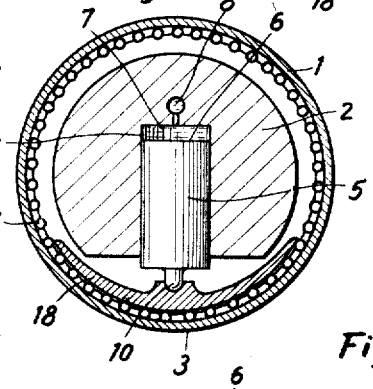

Two embodiments of the invention are illustrated by way of example in the accompanying drawing, in which:

FIG. 1 is a cross-section of a roll according to our invention;

FIG. 2 a longitudinal section through a portion of the roll of FIG. 1;

FIG. 3 a view of the sliding surface of the sliding shoe of the roll illustrated in FIGS. 1 and 2;

FIG. 4 a cross-section of a roll of modified construction, and

Figure 6:
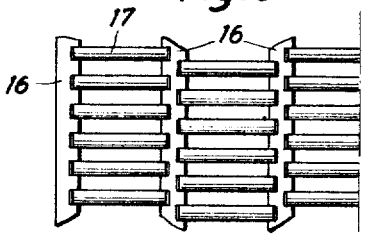
Figure 5:
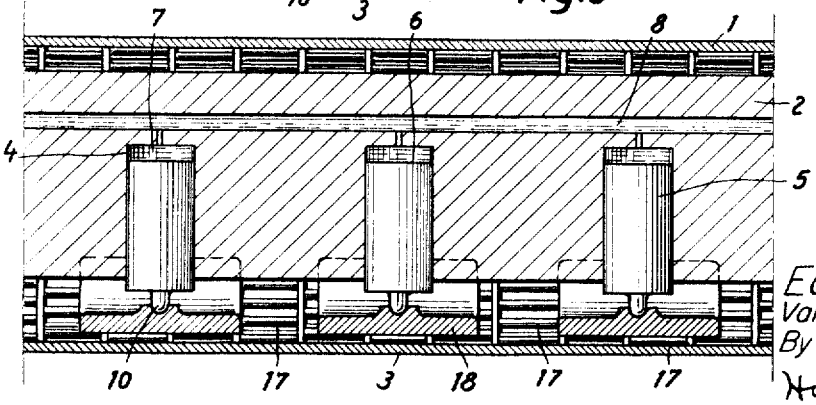

FIG. 5 is a longitudinal section through a portion of the roll according to FIG. 4, while FIG. 6 shows the arrangement of the guide rollers on the inner periphery of the roll.

The figures of the drawing illustrating the subject matter of the invention are confined to the parts which are necessary for understanding the invention.

In the two embodiments shown, the roll comprises a tubular body 1 which constitutes the operating or effective periphery of the roll and is designed to revolve, and a stationary core 2 the ends of which are supported in known manner. The working line of the roll, that is the line or portion which bears against a counter roll or a counter surface, is designated by 3. In the embodiment of FIG. 2 we have shown a core support 20 at the ends of the core.

Blind bores 4 are provided in the core at uniform distances apart with their axes coinciding with a radial beam from the hollow body passing through the working line. These bores form cylinders in each of which a piston 5 is located. The piston face 6 facing the working point 3 is under the influence of a liquid pressure medium 7 which flows through a passage 8 into the core 2 and comes from some suitable source. A gaseous pressure medium may be used instead of a liquid pressure medium.

The end faces directed towards the working line 3 project from the core and are provided with sliding shoes 18. As can be seen from the embodiment illustrated in FIGS. 1 and 2, the sliding shoes can be slipped on to an extension 9 on the pistons. According to FIGS. 4 and 5 the sliding shoes have a rounded recess bearing against the rounded end 10 of a projection on the piston so that they can swing in relation to the pistons, which is frequently advantageous. The sliding shoes are of such a length that they bear in the form of an arc against the internal periphery of the tubular body on both sides of the working line. They may, however, only extend at the most up to a plane extending through the central axis of the tubular body transversely to a line extending from the center of the hollow body radially through the working line. The distance between the neighbouring sliding shoes is chosen of a size to meet the actual requirements. The same applies to the width of the shoes.

In FIGS. 1 to 3 a sliding cushion of oil is provided between the sliding shoes and the inner peripheral surface of the body 1. To accommodate this the sliding surface of the shoes is recessed and provided with depressions 11 in the form of a honeycomb. Furthermore a passage 12 leads from the recessed surface to an internal transverse bore 13. This transverse bore communicates by means of a bore 14 with a passage 15 in the core 2, serving as feed conduit for the pressure oil. The pressure exerted by the oil under pressure against the inner peripheral surface of the tubular body is greater than the pressure which acts on the pistons and presses them against the inner peripheral surface of the tubular body, so that the tubular body floats on an oil layer on the sliding shoes.

The heavier pressure between the sliding shoes and the inner peripheral surface of the hollow body is determined, taking into consideration the ratio between the size of the surface of the sliding shoe facing the inner periphery of the hollow body and the size of the surface of the piston belonging to the shoe and acted upon by the pressure medium. The leak-oil can be caught at the ends of the tubular hollow body and returned into use again.

In the embodiment illustrated in FIGS. 4 to 6, rollers 17 in cages 16 are arranged on the inner periphery of the tubular body 1 along the entire length on which the sliding shoes act. The rollers 17 are made of steel or plastic based on polyamides or superpolyamides or some other suitable material. They here form the sliding means between the sliding shoes and inner periphery of the tubular body. The surface of the sliding shoes facing the rollers is in this case smooth.

We claim:

1. A roll for the pressure treatment of strip material comprising a tubular hollow body free to revolve around an axis and having an inner periphery and an outer periphery which outer periphery is adapted to bear against the strip material along a line of contact, a stationary core, and supports for the core at its ends, in combination with cylinders distributed along the entire length of the core, pistons in said cylinders and a fluid medium in said cylinders adapted under pressure to impinge on said pistons for the purpose of producing a pressure on the inner periphery of the hollow body on the side where it is adapted to bear against the strip material, a sliding shoe on the outer end of each piston disposed in the cylinders and bearing against the inner periphery of the hollow body adjacent the side where the outer periphery is adapted to bear against the strip material, each shoe having a cylindrical section with a continuous outer surface of a radius of curvature substantially equal to that of the inner periphery of the hollow body, by which outer surface the sliding shoe bears against the inner periphery of the hollow body, said outer surface extending from the inner line of the hollow body situated opposite the line of contact of the outer periphery of the hollow body with the strip material, and in both peripheral directions, but not further than perpendicular to the radial straight line from the axis of the hollow body to the line of contact to the strip material, whereby a sliding medium is provided between the face of the shoe and the inner periphery, each of said pistons having an oil duct therethrough.

2. Roll according to claim 1, wherein an oil cushion is provided between the inner peripheral surface of the hollow body and the surface of each sliding shoe facing it, said oil cushion constituting the sliding medium.

3. Roll according to claim 2, wherein the faces of the sliding shoes directed towards the inner peripheral surface of the hollow body have recesses arranged in honeycomb fashion with cups adjacent to each other.

4. Roll according to claim 2, wherein the surface of each sliding shoe facing the inner peripheral surface of the hollow body is conected to a pressure oil feed conduit by a bore extending from this surface and continuing in through the oil duct extending through the piston coordinated to the particular shoe.

5. Roll according to claim 4, wherein the oil duct through each piston includes a transverse bore into which the bore leading from the surface of the sliding shoe leads and which in turn is in communication with an oil passage in the core leading to the wall of the cylinder to which it is coordinated.

6. In a roll for the pressure treatment of strip material comprising a tubular hollow body free to revolve around an axis and having an inner periphery and an outer periphery which outer periphery is adapted to bear against the strip material along a line of contact, a stationary core, and supports for the core at its ends, in combination with cylinders distributed along the entire length of said core, pistons in said cylinders and a fluid medium in said cylinders adapted under pressure to impinge on said pistons for the purpose of producing a pressure on the inner periphery of the hollow body on the side where it is adapted to bear against the strip material, a sliding shoe on the outer end of each piston disposed in the cylinders, said shoes bearing against the inner periphery of the hollow body adjacent the side where the outer periphery is adapted to bear against the strip material, each shoe having a cylindrical section with a continuous outer surface of a radius of curvature substantially equal to that of the inner periphery of the hollow body, said outer surface of each shoe extending rom the inner line of the hollow body situated opposite the line of contact of the outer periphery of the hollow body with the strip material, and in both peripheral directions but not further than perpendicular to a radial straight line from the axis of the hollow body to the line of contact to the strip material, and rollers in cages arranged on the inner periphery of the hollow body along substantially the entire length of the roll, said rollers being disposed between the outer surface of each shoe and the inner periphery of said hollow body and forming a sliding means between the outer surface of each shoe and the inner periphery of said hollow body.

*7. A roll for the pressure treatment of strip material comprising a tubular hollow body free to revolve around an axis and having an inner periphery and an outer periphery which outer periphery is adapted to bear against the strip material along a line of contact, a stationary core, and supports for said core at its ends, in combination with a cylinder disposed in said core, a piston in said cylinder and a fluid medium in said cylinder adapted under pressure to impinge on said piston for the purpose of producing a pressure on the inner periphery of the hollow body on the side where it is adapted to bear against the strip material, a sliding shoe on the outer end of said piston disposed in said cylinder and bearing against the inner periphery of the hollow body adjacent the side where the outer periphery is adapted to bear against the strip material, said sliding shoe having a cylindrical section with a continuous outer surface of a radius of curvature substantially equal to that of the inner periphery of the hollow body, by which outer surface the sliding shoe bears against the inner periphery of the hollow body, said outer surface extending from the inner line of the hollow body situated opposite the line of contact of the outer periphery of the hollow body with the strip material, and in both peripheral directions, but not further than perpendicular to the radial straight line from the axis of the hollow body to the line of contact to the strip material, whereby a sliding medium is provided between the face of said shoe and the inner periphery of the hollow body, said piston having an oil duct therethrough.*

*8. Roll according to claim 7, wherein an oil cushion is provided between the inner peripheral surface of the hollow body and the surface of said sliding shoe facing it, said oil cushion constituting the sliding medium.*

*9. Roll according to claim 8, wherein the face of said sliding shoe directed towards the inner peripheral surface of the hollow body has recesses arranged in honeycomb fashion with cups adjacent to each other.*

*10. Roll according to claim 8, wherein the surface of said sliding shoe facing the inner peripheral surface of the hollow body is connected to a pressure oil feed conduit by a bore extending from this surface and continuing in through the oil duct extending through the piston coordinated to said shoe.*

*11. Roll according to claim 10, wherein the oil duct through said piston includes a transverse bore into which the bore leading from the surface of said sliding shoe leads and which in turn is in communication with an oil passage in the core leading to the wall of the cylinder to which it is coordinated.*

*12. In a roll for the pressure treatment of strip material comprising a tubular hollow body free to revolve around an axis and having an inner periphery and an outer periphery which outer periphery is adapted to bear against the strip material along a line of contact, a stationary core, and supports for the core at its ends, in combination with a cylinder disposed in said core, a piston in said cylinder and a fluid medium in said cylinder adapted under pressure to impinge on said piston for the purpose of producing a pressure on the inner periphery of the hollow body on the side where it is adapted to bear against the strip material, a sliding shoe on the outer end of said piston disposed in the cylinder, said shoe bearing against the inner periphery of the hollow body adjacent to the side where the outer periphery is adapted to bear against the strip material, said shoe having a cylindrical section with a continuous outer surface of a radius of curvature substantially equal to that of the inner periphery of the hollow body, said outer surface of said shoe extending from the inner line of the hollow body situated opposite the line of contact of the outer periphery of the hollow body with the strip material, and in both peripheral directions but not further than perpendicular to a radial straight line from the axis of the hollow body to the line of contact to the strip material, and rollers in cages arranged on the inner periphery of the hollow body along substantially the entire length of the roll, said rollers being disposed between the outer surface of said shoe and the inner periphery of the hollow body and forming a sliding means between the outer surface of said shoe and the inner periphery of the hollow body.*

References Cited

The following references, cited by the Examiner, are of record in the patented file of this patent or the original patent.

UNITED STATES PATENTS

| | | | |
|---|---|---|---|
| 492,072 | 2/1893 | Vaught | 29—116 |
| 2,395,915 | 3/1946 | Specht | 100—155 |
| 2,854,700 | 10/1958 | Caspari et al. | 100—170 |
| 2,950,507 | 8/1960 | Keyser | 29—116 |
| 3,119,324 | 1/1964 | Justus | 29—116 X |

FOREIGN PATENTS

| | | |
|---|---|---|
| 590,181 | 1/1960 | Canada. |

LOUIS O. MAASSEL, *Primary Examiner.*